United States Patent
Ohtsuka et al.

(10) Patent No.: US 12,104,070 B2
(45) Date of Patent: Oct. 1, 2024

(54) COMPOSITION AND COATING FILM

(71) Applicant: DAIKIN INDUSTRIES, LTD., Osaka (JP)

(72) Inventors: Kazuhiro Ohtsuka, Osaka (JP); Masahiro Tomita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 590 days.

(21) Appl. No.: 17/266,427

(22) PCT Filed: Jul. 17, 2019

(86) PCT No.: PCT/JP2019/028137
§ 371 (c)(1),
(2) Date: Feb. 5, 2021

(87) PCT Pub. No.: WO2020/031642
PCT Pub. Date: Feb. 13, 2020

(65) Prior Publication Data
US 2021/0292591 A1    Sep. 23, 2021

(30) Foreign Application Priority Data
Aug. 9, 2018    (JP) .................................. 2018-150740

(51) Int. Cl.
*C09D 127/12*    (2006.01)
*C08K 5/5419*    (2006.01)
*C09D 5/00*    (2006.01)
*C09D 7/63*    (2018.01)

(52) U.S. Cl.
CPC ............. *C09D 127/12* (2013.01); *C09D 5/00* (2013.01); *C09D 7/63* (2018.01); *C08K 5/5419* (2013.01)

(58) Field of Classification Search
CPC .......... C09D 127/12; C09D 7/63; C09D 5/00; C08K 5/5419
USPC ......................................................... 524/265
See application file for complete search history.

(56) References Cited

U.S. PATENT DOCUMENTS

| | | | |
|---|---|---|---|
| 2011/0210295 A1* | 9/2011 | Honda | C23C 18/122 252/519.2 |
| 2012/0295117 A1 | 11/2012 | Iizuka et al. | |

FOREIGN PATENT DOCUMENTS

| CN | 102725363 A | | 10/2012 |
|---|---|---|---|
| CN | 107512060 A | | 12/2017 |
| EP | 3 553 126 A1 | | 10/2019 |
| JP | 10-110078 A | | 4/1998 |
| JP | 2007084667 A | * | 4/2007 |
| JP | 2013-185070 A | | 9/2013 |
| JP | 2017-052277 A | | 3/2017 |
| KR | 10-2011-0086071 A | | 7/2011 |

OTHER PUBLICATIONS

International Search Report for PCT/JP2019/028137 dated Oct. 8, 2019 (PCT/ISA/210).
International Preliminary Report on Patentability issued Feb. 9, 2021 with translation of the Written Opinion in International Application No. PCT/JP2019/028137.
Extended European Search Report issued Mar. 23, 2022 in counterpart European Application No. 19847289.6.

* cited by examiner

*Primary Examiner* — Kelechi C Egwim
(74) *Attorney, Agent, or Firm* — Sughrue Mion, PLLC

(57) ABSTRACT

The disclosure aims to provide a composition that is able to provide a film having excellent abrasion resistance and excellent antifouling properties. The composition contains a perfluorocarbon sulfonic acid resin or sulfonic acid salt resin thereof, a tetraalkoxysilane, and a trialkoxysilane.

7 Claims, No Drawings

COMPOSITION AND COATING FILM

CROSS REFERENCE TO RELATED APPLICATIONS

This application is a National Stage of International Application No. PCT/JP2019/028137 filed Jul. 17, 2019, claiming priority based on Japanese Patent Application No. 2018-150740 filed Aug. 9, 2018.

TECHNICAL FIELD

The disclosure relates to a composition and a film obtainable from the composition.

BACKGROUND ART

Coating materials containing Nafion®, which is a fluororesin, alone are known examples of coating materials for outer walls of structures, but Nafion® cannot be used in a high-temperature environment.

Patent Literature 1 aims to improve the heat resistance and discloses perfluorocarbon sulfonic acid polymer-containing nanocomposite particles obtainable by preparing a reaction material liquid containing (a) core silica particles having an average particle size of 5 to 200 nm, (b) an alkoxysilane, (c) a perfluorocarbon sulfonic acid polymer, and (d) a reaction solvent, adding 1 mL or more of ammonia water as $NH_3$ per 1 mL of the alkoxysilane (b) to hydrolyze the alkoxysilane, and thereby performing surface treatment on the core silica particles.

CITATION LIST

Patent Literature

Patent Literature 1: JP 2013-185070 A

SUMMARY OF INVENTION

Technical Problem

The disclosure aims to provide a composition that is able to provide a film having excellent abrasion resistance and excellent antifouling properties. The disclosure also provides a film having excellent abrasion resistance and excellent antifouling properties.

Solution to Problem

The disclosure relates to a composition containing a perfluorocarbon sulfonic acid resin or sulfonic acid salt resin thereof, a tetraalkoxysilane, and a trialkoxysilane.

In the composition of the disclosure, the tetraalkoxysilane and the trialkoxysilane are preferably present in a total amount of 100 parts by mass or more relative to 100 parts by mass of the perfluorocarbon sulfonic acid resin or sulfonic acid salt resin thereof.

The perfluorocarbon sulfonic acid resin preferably has an equivalent weight of 600 to 1000.

The perfluorocarbon sulfonic acid resin preferably includes a copolymer containing a polymerized unit represented by —($CF_2$—CFZ)— (wherein Z is H, Cl, F, or a C1-C3 perfluoroalkyl group) and a polymerized unit represented by —($CF_2$—CF(—O—($CF_2$)$_m$—$SO_3$H))— (wherein m is an integer of 1 to 12).

The perfluorocarbon sulfonic acid resin or sulfonic acid salt resin thereof is preferably a perfluorocarbon sulfonic acid salt resin.

The composition of the disclosure preferably further contains an acid catalyst. The composition of the disclosure preferably further contains a solvent.

The composition of the disclosure is preferably a surface-treating agent.

The disclosure also relates to a film obtainable from the composition.

Advantageous Effects of Invention

The composition of the disclosure has the above structure, and thus is able to provide a film having excellent abrasion resistance and excellent antifouling properties. The film of the disclosure has excellent abrasion resistance and excellent antifouling properties.

DESCRIPTION OF EMBODIMENTS

The inventors performed studies for solutions to the problem and found that combination use of a tetraalkoxysilane and a trialkoxysilane can significantly improve the abrasion resistance and antifouling properties of a film obtainable from a composition containing a perfluorocarbon sulfonic acid resin or sulfonic acid salt resin thereof, arriving at the development of the disclosure.

The composition of the disclosure is described in detail below. The composition of the disclosure is not limited to the following embodiments and may be modified in various manners within the scope of the spirit of the disclosure.

The composition of the disclosure contains a perfluorocarbon sulfonic acid resin or sulfonic acid salt resin thereof, a tetraalkoxysilane, and a trialkoxysilane. This structure allows the composition of the disclosure to provide a film having excellent abrasion resistance and excellent antifouling properties. The resulting film also has excellent adhesiveness to a substrate.

The perfluorocarbon sulfonic acid resin is a resin in which a sulfonic acid group is bonded to a perfluorocarbon.

The perfluorocarbon sulfonic acid resin is preferably a copolymer containing a polymerized unit represented by —($CF_2$—CFZ)— (wherein Z is H, Cl, F, or a C1-C3 perfluoroalkyl group) and a polymerized unit represented by —($CF_2$—CF(—O—($CF_2$)$_m$—$SO_3$H))— (wherein m is an integer of 1 to 12). The presence of a perfluorocarbon sulfonic acid resin or sulfonic acid salt resin thereof having the above structure enables formation of a film having excellent abrasion resistance and excellent antifouling properties. Use of the composition as a coating material can give improved adhesiveness between the film and a substrate coated with the composition.

In order to provide a film having excellent abrasion resistance, excellent antifouling properties, and excellent adhesiveness to a substrate, m is preferably an integer of 1 to 6 and Z is preferably F.

The perfluorocarbon sulfonic acid resin is preferably one obtainable by hydrolyzing a perfluorocarbon sulfonic acid resin precursor that includes a copolymer of a vinyl fluoride ether compound represented by the following formula (1) and a fluorinated olefin monomer represented by the following formula (2).

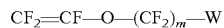  (1)

In the formula, m is an integer of 1 to 12, and W is a functional group that may be converted into —SO$_3$H by hydrolysis.

$$CF_2=CFZ \quad (2)$$

In the formula, Z is H, Cl, F, or a C1-C3 perfluoroalkyl group.

The functional group W that may be converted into —SO$_3$H by hydrolysis in the formula (1) is preferably SO$_2$F, SO$_2$Cl, or SO$_2$Br. Preferably, m is an integer of 1 to 6. With m being an integer of 1 to 6, the perfluorocarbon sulfonic acid resin tends to have a low equivalent weight EW as well as improved abrasion resistance and improved antifouling properties.

For the perfluorocarbon sulfonic acid resin precursor, preferably, W is SO$_2$F and Z is F in the formulae (1) and (2). In particular, in order to provide a film having high abrasion resistance and high antifouling properties, more preferably, m is an integer of 1 to 6, W is SO$_2$F, and Z is F.

The perfluorocarbon sulfonic acid resin precursor can be synthesized by a known technique. Known examples thereof include those utilizing a peroxide of a radical generator, such as: a polymerization method in which a polymerization solvent such as a fluorine-containing hydrocarbon is used, a vinyl fluoride compound containing the aforementioned functional group that may be converted into —SO$_3$H by hydrolysis and a gaseous fluorinated olefin such as tetrafluoroethylene (TFE) are charged into and dissolved in the solution, and the contents are reacted for polymerization (solution polymerization); a polymerization method in which a vinyl fluoride compound itself is used as a polymerization solvent without use of a solvent such as a fluorine-containing hydrocarbon (bulk polymerization); a polymerization method in which, with an aqueous solution of a surfactant being used as a medium, a vinyl fluoride compound and a gaseous fluorinated olefin are charged and the contents are reacted for polymerization (emulsion polymerization); a polymerization method in which a vinyl fluoride compound and a gaseous fluorinated olefin are charged into an aqueous solution of a surfactant and an emulsification aid such as an alcohol and the contents are emulsified and reacted for polymerization (miniemulsion polymerization, microemulsion polymerization); and a polymerization method in which a vinyl fluoride compound and a gaseous fluorinated olefin are charged into and suspended in an aqueous solution of a suspension stabilizer and the contents are reacted for polymerization (suspension polymerization). In the present embodiment, the perfluorocarbon sulfonic acid resin precursor used may be produced by any of these polymerization methods.

The perfluorocarbon sulfonic acid resin precursor produced as described above preferably has a melt index (MI) of 0.05 to 50 g/10 min, more preferably 0.1 to 30 g/10 min, most preferably 0.2 to 20 g/10 min. MI is the mass of a polymer extruded, expressed by grams per 10 minutes, determined using a melt indexer at 270° C. and a load of 2.16 kg in conformity with JIS K 7210.

The perfluorocarbon sulfonic acid resin precursor produced as described above is preferably extrusion-molded through a nozzle or die using an extruder. The molding technique and the shape of the molded article are not limited. In order to increase the processing rate in the hydrolysis and acid treatment to be described later, the molded article is preferably in the form of pellets having a size of 0.5 cm$^3$ or smaller. Still, the molded article used may be a powder after polymerization.

The perfluorocarbon sulfonic acid resin precursor molded as described above is then immersed in a basic reaction liquid for hydrolysis.

The basic reaction liquid used for hydrolysis is preferably, but is not limited to, an aqueous solution of an amine compound such as dimethylamine, diethylamine, monomethylamine, or monoethylamine, or an aqueous solution of a hydroxide of an alkali metal or an alkaline earth metal, particularly preferably an aqueous solution of sodium hydroxide or potassium hydroxide. The amount of the hydroxide of an alkali metal or an alkaline earth metal is preferably, but is not limited to, 10 to 30% by mass of the whole reaction liquid. The reaction liquid more preferably further contains any of swellable organic compounds such as methyl alcohol, ethyl alcohol, acetone, and DMSO. The amount of the swellable organic compound is preferably 1 to 30% by mass of the whole reaction liquid.

The perfluorocarbon sulfonic acid resin precursor, after hydrolysis in the basic reaction liquid, is sufficiently washed with, for example, warm water, followed by acid treatment. Preferred examples of the acid used in the acid treatment include, but are not limited to, mineral acids such as hydrochloric acid, sulfuric acid, and nitric acid, and organic acids such as oxalic acid, acetic acid, formic acid, and trifluoroacetic acid. More preferred is a mixture of water and any of these acids. Two or more of these acids may be used together. This acid treatment protonates the perfluorocarbon sulfonic acid resin precursor and allows it to have —SO$_3$H. The perfluorocarbon sulfonic acid resin obtained by protonation can dissolve in a protic organic solvent, water, or a solvent mixture of both.

The perfluorocarbon sulfonic acid resin preferably has an equivalent weight EW (dry weight in gram of the perfluorocarbon sulfonic acid resin per equivalent of proton exchange groups) of 600 to 1000. An equivalent weight EW within the above range can lead to improved abrasion resistance and antifouling properties of a film obtainable from the composition. Too small an equivalent weight EW may cause easy peeling of the resulting film off the substrate. Too large an equivalent weight EW may cause a failure in achieving excellent abrasion resistance and excellent antifouling properties. The equivalent weight EW of the perfluorocarbon sulfonic acid resin is preferably 620 or higher, more preferably 680 or higher, while preferably 980 or lower, more preferably 970 or lower, still more preferably 960 or lower, further more preferably 950 or lower, still further more preferably 940 or lower, particularly preferably 930 or lower.

The equivalent weight EW of the perfluorocarbon sulfonic acid resin can be determined by conversion of the perfluorocarbon sulfonic acid resin into a salt form and back titration of the solution thereof with an alkali solution.

Part of the sulfonic acid groups of the perfluorocarbon sulfonic acid resin may be crosslinked to control the water-solubility and excessive swellability. Examples of the crosslinking include a reaction between a sulfonic acid group and the main chain, a reaction between sulfonic acid groups, crosslinking of sulfonic acid groups with a high-molecular-weight or low-molecular-weight cross-linking agent, and crosslinking of salts of sulfonic acid groups.

The perfluorocarbon sulfonic acid resin preferably has an equilibrium water absorption of at least 5% by weight, more preferably at least 7% by weight, still more preferably at least 10% by weight, particularly preferably at least 15% by weight. An equilibrium water absorption of 5% by weight or higher allows the hydrophilicity of the film surface to be less susceptible to the conditions for use (environmental changes such as weather and sticking of contaminants). The upper limit thereof is preferably 50% by weight, more preferably 45% by weight, still more preferably 40% by weight. An equilibrium water absorption of 50% by weight or lower can lead to properties such as stable water resistance and adhesiveness to the coated surface. When moisture resulting from, for example, rain or water sprinkling is present on the coating surface, a low EW region can have a significantly high moisture content, thereby having a much higher stain-resistant effect. Accordingly, the resulting composition is more effective for coating on exterior structures such as rooftops, outer walls, bridges, steel towers, antennas, solar cell surfaces, and sunlight-reflecting mirrors.

The equilibrium water absorption (Wc) of the perfluorocarbon sulfonic acid resin is calculated from the film weight determined as follows: a dispersion of the polymer in water and an alcoholic solvent is cast and dried at 160° C. or lower to provide a film, and then the weight of the film is measured after the film is left to stand at 23° C. and 50% relative humidity (RH) for 24 hours.

A sulfonic acid salt resin of the perfluorocarbon sulfonic acid resin (hereinafter, also referred to as a "perfluorocarbon sulfonic acid salt resin") is a salt obtainable by replacing the hydrogen ion of the sulfonic acid group by a cation.

The perfluorocarbon sulfonic acid salt resin has higher water absorbability than the perfluorocarbon sulfonic acid resin, and thus can give more improved antifouling properties. Further, the perfluorocarbon sulfonic acid salt resin can provide a film having excellent transparency. The perfluorocarbon sulfonic acid resin or sulfonic acid salt resin thereof is preferably a perfluorocarbon sulfonic acid salt resin.

Examples of the replacing cation include metal ions and an ammonium ion. Preferred are metal ions in terms of dispersibility. Examples of the metal ions include $Na^+$, $K^+$, $Li^+$, $Ca^{2+}$, and $Mg^{2+}$. In the case of using a divalent metal ion as a replacing cation, the resulting salt is such that the hydrogen ions of two sulfonic acid groups are replaced by the cation.

The perfluorocarbon sulfonic acid salt resin is obtainable by neutralization or ion exchange on the perfluorocarbon sulfonic acid resin. For example, the perfluorocarbon sulfonic acid salt resin is obtainable by ion exchange in which the perfluorocarbon sulfonic acid resin is brought into contact with an ion exchange polymer. Examples of the ion exchange polymer used include cation exchange polymers such as a Na-type ion-exchange polymer and a K-type ion-exchange polymer.

In the case where the perfluorocarbon sulfonic acid salt resin is a sulfonic acid salt of a perfluorocarbon sulfonic acid resin having an equivalent weight of 600 to 1000, the equivalent weight can be confirmed by hydrogenation of the sulfonic acid salt into the sulfonic acid form, re-conversion of the acid into a salt form, and back-titration of the resulting liquid with an alkali solution.

The equivalent weight (g/eq) of the perfluorocarbon sulfonic acid resin or sulfonic acid salt resin thereof can be determined by the following formula. The perfluorocarbon sulfonic acid resin is used as it is for the determination. The sulfonic acid salt resin thereof is hydrogenated into the sulfonic acid form to provide a perfluorocarbon sulfonic acid resin before the determination.

$$EW=(w/M)-22$$

In the formula, M represents the amount of substance (mmol) of sodium hydroxide used for neutralizing the perfluorocarbon sulfonic acid resin and w represents the mass (mg) of the perfluorocarbon sulfonic acid resin containing a sodium ion as the counter ion of the ion-exchange group.

For example, about 0.3 g of a perfluorocarbon sulfonic acid resin is immersed in 30 mL of a saturated NaCl aqueous solution at 25° C. and left to stand for 30 minutes under stirring. Then, protons in the saturated NaCl aqueous solution are subjected to neutralization titration with a 0.01 N sodium hydroxide aqueous solution using phenolphthalein as an indicator or using an automatic titrator. The amount of substance of sodium hydroxide used for neutralization is expressed by M. The perfluorocarbon sulfonic acid resin which is obtained after the neutralization and which contains a sodium ion as the counter ion of the ion-exchange group is washed with pure water and dried in a vacuum. The mass of the product weighed is expressed by w.

The hydrogenation of the perfluorinated sulfonic acid salt resin may be an acid treatment, for example. An exemplary method for providing a perfluorocarbon sulfonic acid resin by the hydrogenation is a method including spreading 3 g of an aqueous solution (solid content: 20%) of a perfluorocarbon sulfonic acid salt resin in a petri dish having a diameter of 5 cm and heating the workpiece on an electric griddle at 80° ° C. for one hour, then at 120° C. for 30 minutes, to provide a solid polymer film, immersing the solid in 100 mL of a 1 N HCl aqueous solution at 60° C. for six hours, washing the workpiece with deionized water (electrical conductivity: 0.06 S/cm) at 60° C., and drying the workpiece to provide a hydrogenated solid polymer film.

Examples of the tetraalkoxysilane include tetramethoxysilane, tetraethoxysilane, tetraisopropoxysilane, tetrabutoxysilane, and dimethoxydiethoxysilane. The tetraalkoxysilane preferably includes at least one selected from the group consisting of tetramethoxysilane and tetraethoxysilane, and is more preferably tetramethoxysilane.

Examples of the trialkoxysilane include methyltrimethoxysilane, methyltriethoxysilane, vinyltrimethoxysilane, phenyltrimethoxysilane, 3-methacryloxypropyltrimethoxysilane, 3-acryloxypropyltrimethoxysilane, trimethoxy (3-glycidyloxypropyl) silane, 2-cyanoethyltriethoxysilane, (3-isocyanatopropyl) trimethoxysilane, (3-ureidopropyl) trimethoxysilane, and 3-aminopropyltriethoxysilane. The trialkoxysilane preferably includes at least one selected from the group consisting of trimethoxy (3-glycidyloxypropyl) silane and methyltriethoxysilane, and is more preferably trimethoxy (3-glycidyloxypropyl) silane.

In order to achieve excellent abrasion resistance, excellent antifouling properties, and excellent adhesiveness to a substrate, the tetraalkoxysilane and the trialkoxysilane in the composition of the disclosure are preferably present in a total amount of 100 parts by mass or more, more preferably 120 parts by mass or more, still more preferably 150 parts by mass or more, further more preferably 300 parts by mass or more, particularly preferably 700 parts by mass or more, while preferably 2000 parts by mass or less, more preferably 1800 parts by mass or less, relative to 100 parts by mass of the perfluorocarbon sulfonic acid resin or sulfonic acid salt resin thereof.

In order to achieve excellent abrasion resistance, antifouling properties, and adhesiveness to a substrate, the composition of the disclosure preferably has a ratio (tetraalkoxysilane/trialkoxysilane) by mass of the tetraalkoxysilane to the trialkoxysilane of 95/5 to 10/90, more preferably 80/20 to 30/70, still more preferably 75/25 to 40/60.

The composition of the disclosure preferably further contains an acid catalyst. The presence of the acid catalyst allows a silica compound to form a highly uniform network structure, leading to formation of a transparent film having excellent abrasion resistance and antifouling properties.

Examples of the acid catalyst include hydrofluoric acid, hydrochloric acid, sulfuric acid, and nitric acid.

The acid catalyst is preferably in an amount of 0.05 parts by mass or more, more preferably 0.07 parts by mass or more, still more preferably 0.1 parts by mass or more, while preferably 10 parts by mass or less, more preferably 7 parts by mass or less, still more preferably 5 parts by mass or less, relative to 100 parts by mass in total of the tetraalkoxysilane and the trialkoxysilane.

The composition of the disclosure preferably further contains a solvent. The composition of the disclosure is commonly such that the perfluorocarbon sulfonic acid resin or sulfonic acid salt resin thereof, the tetraalkoxysilane, and the trialkoxysilane are dissolved or dispersed in a solvent. The composition containing a solvent can be preferably used as a coating material or a surface-treating agent. In other words, the composition of the disclosure is preferably a coating material and preferably a surface-treating agent. The surface-treating agent is used for modifying (performing surface treatment on) the surface of a substrate. Use of the composition of the disclosure as a surface-treating agent can give excellent abrasion resistance and excellent antifouling properties to the surface of a substrate.

The amount of the solvent in the composition of the disclosure may be, but is not limited to, 500 to 50000 parts by mass relative to 100 parts by mass of the perfluorocarbon sulfonic acid resin or sulfonic acid salt resin thereof. From the viewpoint of film formability, the amount is preferably 2000 to 20000 parts by mass.

Any solvent having good affinity with the perfluorocarbon sulfonic acid resin or sulfonic acid salt resin thereof, the tetraalkoxysilane, and the trialkoxysilane may be used for the composition of the disclosure. A single solvent may be used or a mixture of two or more solvents may be used.

The solvent preferably contains one or both of water and an organic solvent. Examples of the organic solvent include esters such as ethyl acetate, butyl acetate, isopropyl acetate, isobutyl acetate, cellosolve acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N, N-dimethylformamide and N, N-dimethylacetamide; aromatic hydrocarbons such as toluene and xylene; alcohols such as methanol, ethanol, 1-propanol, 2-propanol, 1-butanol, 2-butanol, isobutyl alcohol, tert-butyl alcohol, and propylene glycol methyl ether;

hydrocarbons such as hexane and heptane; and solvent mixtures thereof. The solvent is preferably one that is able to dissolve the perfluorocarbon sulfonic acid resin or sulfonic acid salt resin thereof.

From the viewpoint of the period of time for drying the film obtainable from the composition of the disclosure, the solvent preferably has a boiling point of 250° C. or lower, more preferably 200° C. or lower, still more preferably 120° C. or lower.

The solvent is preferably an alcohol, and specifically preferably includes at least one selected from the group consisting of methanol, ethanol, 1-propanol, 2-propanol, 1-butanol, 2-butanol, isobutyl alcohol, and tert-butyl alcohol. The solvent in the composition of the disclosure may contain both an alcohol and water.

In order to give other properties such as adhesiveness, the composition of the disclosure (e.g., a coating material or a surface-treating agent) may be used in the form of a mixture with a known resin coating material. Examples of the resin coating material include an oily coating material, lacquer, a solvent-type synthetic resin coating material (e.g., acrylic resin-type, epoxy resin-type, urethane resin-type, fluororesin-type, silicone-acrylic resin-type, alkyd resin-type, aminoalkyd resin-type, vinyl resin-type, unsaturated polyester resin-type, chlorinated rubber-type), an aqueous synthetic resin coating material (e.g., emulsion-type, aqueous resin-type), a solvent-free synthetic resin coating material (e.g., powdery coating material), an inorganic coating material, and an electrically insulated coating material. Preferably used among these resin coating materials are resin coating materials of silicone resin, fluororesin, or combination of silicone resin and fluororesin.

Examples of the silicone resin include an alkoxysilane and/or an organoalkoxysilane and a hydrolysis product (polysiloxane) thereof, and/or colloidal silica, as well as acryl-silicone resin, epoxy-silicone resin, and urethane-silicone resin each containing 1 to 80% by mass of silicone, and a resin containing 1 to 80% by mass of an alkoxysilane and/or an organoalkoxysilane and a hydrolysis product (polysiloxane) thereof and/or colloidal silica. These silicone resins may be in any form selected from powder and a solution or dispersion in a solvent, and may contain any of additives such as a cross-linking agent and a catalyst.

In order to improve the weather resistance and to reduce discoloration, the fluororesin may be mixed with a known fluororesin that may dissolve in a solvent. The fluororesin used may be a fluororesin containing a curable functional group.

The composition of the disclosure preferably contains metal particles in an amount of 0.5 parts by mass or less, more preferably 0.1 parts by mass or less, still more preferably 0.01 parts by mass or less, relative to 100 parts by mass of the perfluorocarbon sulfonic acid resin or sulfonic acid salt resin thereof, and is particularly preferably substantially free from metal particles.

The metal particles mean particles containing a metal atom. Examples thereof include simple metal particles, metal oxide particles, metal nitride particles, and metal salts. Examples of the metal include gold, silver, copper, silicon, and boron. Examples of the metal oxide particles include particles of silica, alumina, iron oxide, zinc oxide, or the like. Examples of the metal nitride particles include particles of nitride of gallium, titanium, lithium, or the like. Examples of the metal salts include silver sulfide, barium carbonate, and strontium carbonate. The metal particles may have an average particle size of 5 to 200 nm, for example.

The composition of the disclosure may be produced by a method of mixing a solvent, tetramethoxysilane, trimethoxysilane, and a perfluorocarbon sulfonic acid resin or sulfonic acid salt resin thereof. The mixing preferably involves addition of an acid catalyst.

The mixing temperature may be, but is not limited to, room temperature. For example, the mixing may be performed at −5° C. to 50° C., preferably 0° ° C. to 30° C.

The above method may be a method including putting the components into a vessel and stirring them. The stirring rate is preferably, but is not limited to, 200 rpm or higher, more preferably 500 rpm or higher.

The stirring duration is preferably, but is not limited to, 1 to 72 hours, preferably 2 to 24 hours.

In the above method, a solution of the perfluorocarbon sulfonic acid resin or sulfonic acid salt resin thereof in a solvent may be used.

In the above method, the solvent is preferably an alcohol. The method performed in an alcohol allows smooth progress of hydrolysis of the tetraalkoxysilane and trialkoxysilane and dehydrofluorination of the perfluorocarbon sulfonic acid resin or sulfonic acid salt resin thereof.

The composition of the disclosure is particularly suitable as a surface-treating agent and, although the uses thereof are not limited, the surface treating agent is particularly suitable for optical members, windowpanes of vehicles, and windowpanes of buildings because the surface treating agent can provide a film having excellent abrasion resistance and excellent antifouling properties.

In addition to the use as a surface-treating agent, the composition of the disclosure may also be used as, for example, an additive for coating materials or resins.

The disclosure also relates to a film obtainable from the composition. The film obtainable from the composition of the disclosure has excellent abrasion resistance and excellent antifouling properties.

The film of the disclosure preferably has a thickness of 0.05 µm or greater, more preferably 0.1 µm or greater, while preferably 20 µm or smaller, more preferably 10 µm or smaller, although not limited thereto.

The film of the disclosure preferably has a contact angle in the air of 30 degrees or larger. A film having a contact angle in the air of 45 degrees or larger can have excellent antifouling properties. The contact angle is more preferably 50 degrees or larger, still more preferably 60 degrees or larger. The upper limit of the contact angle in the air may be, but is not limited to, 120 degrees.

The contact angle in the air is a value measured using a contact angle meter. Specifically, 2 µL of water is dropped on the film in the air at 25° C. and the contact angle after one second from the dropping is measured. The average of five measured values may be taken as the contact angle.

The film of the disclosure preferably has a contact angle in water of 10 degrees or larger. The contact angle is more preferably 15 degrees or larger, still more preferably 20 degrees or larger, particularly preferably 25 degrees or larger. The upper limit of the contact angle in water may be, but is not limited to, 125 degrees.

The contact angle in water is a value measured using a contact angle meter. For example, a glass cell (60×60×40 mm, thickness: 2 mm) is filled with water and a substrate provided with the film is completely immersed in water and fixed therein with the treated surface down. Then, 2 µL of a bubble is attached to the treated surface fixed in water using a microsyringe and the contact angle of the bubble is measured. Then, the contact angle is calculated by "180− (contact angle of bubble)".

The film of the disclosure is obtainable from the composition. Specifically, the film is obtainable by applying the composition to a substrate and optionally drying the composition.

Examples of techniques of applying the composition to a substrate include, but are not limited to, conventionally known techniques such as brush coating, roller coating, spray coating, and dip (immersion) coating, although not limited to these examples in the disclosure.

Examples of drying techniques include, but are not limited to, conventionally known techniques such as hot-air drying and natural drying, although not limited to these examples in the disclosure.

The substrate may be formed from any appropriate material, such as glass, resin (natural or synthetic resin, e.g., a common plastic material in the form of plate, film, or the like), metal (e.g., simple metal of aluminum, copper, or iron, and a composite of these such as alloy), ceramic, semiconductor (e.g., silicon, germanium), fiber (e.g., textile, nonwoven fabric), fur, hide, wood, pottery, stone, or building material.

From the viewpoint of adhesiveness between the film and a substrate, the substrate is preferably glass or aluminum, more preferably glass. The disclosure also encompasses a laminate including the film on a substrate. The laminate may include an intermediate layer between the film obtainable from the composition of the disclosure and a substrate, or the film may be directly on the substrate. In order to sufficiently achieve the properties of the substrate itself, to produce the laminate easily, and to enjoy economic advantages, the film obtainable from the composition of the disclosure is preferably directly on the substrate.

The substrate may have any shape. A surface region of the substrate on which the film is to be provided may be at least part of the surface of the substrate, and may be selected as appropriate in accordance with the target use and specifications of the laminate.

At least a surface portion of the substrate may be formed from a material that originally contains a hydroxy group. Examples of such a material include glass, as well as metal (especially a base metal), ceramic, and semiconductor on the surface of which a naturally oxidized film or a thermally oxidized film is to be formed. In the case of resin or another material that contains, but not sufficiently, a hydroxy group or that originally contains no hydroxy group, the substrate may be subjected to a certain pre-treatment so that a hydroxy group is introduced to the surface of the substrate or the number of hydroxy groups is increased. Examples of the pre-treatment include plasma treatment (e.g., corona discharge) and ion beam application. Plasma treatment may suitably be used not only to introduce a hydroxy group to the surface of the substrate or increase the number of hydroxy groups but also to clean the surface of the substrate (remove foreign substances, for example). Another example of such a pre-treatment is a method in which an interfacial adsorbent containing a carbon-carbon unsaturated bond group is first applied in the form of a monolayer to the surface of the substrate by a technique such as the Langmuir-Blodgett (LB) method or chemical adsorption and the unsaturated bond is then cleaved in an atmosphere containing substances such as oxygen and nitrogen.

Alternatively, at least a surface portion of the substrate may be formed from a silicone compound containing one or more other reactive groups, such as Si—H groups, or an alkoxysilane-containing material.

The substrate is preferably a windowpane for vehicles or a windowpane for buildings. In general, windowpanes for vehicles and windowpanes for buildings are desired to prevent sticking of those reducing the visibility, such as water drops or dirt, to the surface thereof. For example, material such as raindrops, dust, or dirt sticking to the surface of a windowpane for vehicles or moisture condensed on the surface due to the humidity or temperature in the air impairs the transparency and translucency of the windowpane, inhibiting driving of a vehicle such as an automobile. Thus, water drops sticking to the windowpane of an automobile are removed by physical means such as a windshield wiper or a hand. Accordingly, the glass used for these windowpanes for vehicles or windowpanes for buildings needs to have excellent antifouling properties as well as abrasion resistance that enables maintenance of these properties for a long period of time. The film obtainable from the composition of the disclosure has excellent antifouling properties and excellent abrasion resistance, and thus is particularly suitable for the cases where the substrate is a windowpane for vehicles or a windowpane for buildings.

The term "vehicles" herein means vehicles such as passenger cars, vans, minivans, buses, sports utility vans (SUVs), trucks, semi-trucks, trains, tramways, tractors, motorcycles, trailers, light trucks, large-vehicle movers such as bulldozers, crane trucks, and earth movers, and transport vehicles such as airplanes, boats, ships, rockets, and the like.

The substrate may also suitably be any of inner or outer windowpanes of buildings, eyeglasses, windshields, side glasses, rear glasses, quarter glasses, and side-view mirrors of vehicles, glasses and lenses for watches or swimming goggles, glass covers of devices or instruments, wind covers for motorcycle helmets or helmets, glass lenses such as telescope lenses or camera lenses, transparent separating devices such as glass safety screens and droplet blocking walls, glass or plastic windows such as glass doors or windows of devices or instruments such as chemical reaction hoods, biological or medical hoods, incubators, cabinets, microwave ovens, toaster ovens, or refrigerators, show window glasses, crime prevention glasses, and stainless steel taps or shower heads for water supply.

A windshield is fixable on a vehicle and is removable from the vehicle. A windshield is typically formed from a tempered glass, a polymer material such as plastic, or a polymer material reinforced glass or a laminated glass. A typical windshield of an automobile may include two or more glass sheets with a plastic layer in between. Other windowpanes of a vehicle such as side glasses, rear glasses, and quarter glasses may also be a substrate on which the film of the disclosure is to be formed. In order to give good visibility therethrough, the windshield of a vehicle necessarily has water repellency. This prevents sticking of raindrops, water droplets, or dust to the windshield.

For the substrate that is an automobile glass such as a windshield, a side glass, or a rear glass, a building material, or a stone material, for example, the film obtainable from the composition of the disclosure preferably has a thickness of 10 nm to 50 μm, more preferably 50 nm to 20 μm, particularly preferably 100 nm to 10 μm, from the viewpoints of UV resistance, surface lubricity, abrasion resistance, and antifouling properties.

For the substrate that is a windshield, the thickness of the substrate may be 2 to 30 mm. In order to maintain the strength of the glass, the thickness may be 3 mm or greater and 20 mm or smaller, more preferably 4 mm or greater and 8 mm or smaller. For the substrate that is a side glass or a rear glass, the thickness of the substrate may be 3 to 15 mm, preferably 4 to 7 mm.

The substrate may also be an optical material. Preferred examples of the optical material include optical materials relating to displays to be described later, as well as a wide variety of optical materials:

displays such as cathode ray tubes (CRTs, e.g., TVs, PC monitors), liquid crystal displays, plasma displays, organic EL displays, inorganic thin-film EL dot matrix displays, rear projection displays, vacuum fluorescent displays (VFDs), and field emission displays (FEDs), protective plates for these displays, and these displays with the surfaces thereof treated with an antireflection film.

The substrate may also be an optical member. Examples of the optical member include the following:

lenses of eyeglasses; front surface protective plates, antireflection plates, polarizing plates, and anti-glare plates for displays such as PDPs and LCDs; touchscreen sheets for devices such as mobile phones and personal digital assistants; disc surfaces of optical discs such as Blu-ray discs, DVDs, CD-R discs, and MO discs; and optical fibers.

For the substrate that is an optical member, the thickness of the film is preferably 10 nm to 10 μm, more preferably 50 nm to 5 μm.

For the substrate that is an optical member, the material constituting the surface of the substrate may be a material for optical members, such as glass or transparent plastic. The surface (outermost layer) of the substrate may be provided with a layer (or film) such as a hard coating layer and an antireflection layer. The antireflection layer may be either a monolayer antireflection layer or a multilayer antireflection layer. Examples of inorganic substances to be used for the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. One of these inorganic substances may be used alone, or two or more of these may be used in combination (e.g., in the form of a mixture). In the case of a multilayer antireflection layer, the outermost layer thereof is preferably formed from $SiO_2$ and/or $SiO$.

In the case where the target article (laminate) is an optical glass member for touchscreens, part of the surface of the substrate (glass) may be provided with a transparent electrode, such as a thin film formed from indium tin oxide (ITO) or indium zinc oxide. In accordance with the specifications, the substrate may be provided with any of an insulating layer, an adhesive layer, a protective layer, a decorated frame layer (I-CON), an atomizing film layer, a hard coating layer, a polarizing film, a retardation film, and a liquid crystal display module.

The substrate may be a medical instrument or a medical material.

EXAMPLES

The embodiments are specifically described with reference to examples and a comparative example. Still, the embodiments are not intended to be limited by the following examples without departing from the spirit of the embodiments.

Contact Angle (in the Air, in Water)

The contact angles were measured as follows. Specifically, a liquid composition prepared by the method described in the EXAMPLES was applied to a microscope slide and the contact angles were measured using an automatic contact angle meter (model: DropMaster700, Kyowa Interface Science Co., Ltd.).

(Contact Angle in the Air)

In the atmosphere at 25° C., 2 μL of water was dropped onto the workpiece and the contact angle after one second from the dropping was measured. The average of five measured values was taken as the contact angle in the air.

(Contact Angle in Water)

A glass cell (60×60×40 mm, thickness: 2 mm) was filled with water and the surface-treated microscope slide was completely immersed in water and fixed therein with the treated surface down. Then, 2 μL of a bubble was attached to the treated surface fixed in water using a microsyringe and the contact angle of the bubble was measured. The contact angle in water was calculated by "180−(contact angle of bubble)". The results are shown in Table 3.

Haze

The haze was measured using a haze meter (HZ-V3, Suga Test Instruments Co., Ltd.).

Preparation Example 1: Preparation of Perfluorocarbon Sulfonic Acid Sodium Salt Resin Aqueous Solution The perfluorocarbon sulfonic acid sodium salt resin solution used in the examples and the comparative example was prepared by forming a Na-form emulsion through the polymerization, hydrolysis, and ultrafiltration described in Example 1 of WO 2011/034179 and subjecting the resulting Na-form emulsion to the dissolution described in Example 1 of WO 2015/002073.

(Measurement of EW of Sodium Perfluorosulfonate Solution)

The EW of the perfluorinated sulfonic acid salt resin used in Example 1 was measured as follows.

First, 3 g of the perfluorinated sulfonic acid salt resin aqueous solution (solid content: 20%) was spread in a petri dish having a diameter of 5 cm and the workpiece was heated on an electric griddle at 80°C for one hour, then at 120° C. for 30 minutes. Thereby, a solid polymer film was provided. This solid was immersed in 100 mL of a 1 N HCl aqueous solution at 60°C for six hours, washed with deionized water (electrical conductivity: 0.06 S/cm) at 60° ° C., and dried. Thereby, a hydrogenated solid polymer film was provided. A 0.28-g portion was cut out of the solid and immersed in 30 mL of a saturated NaCl solution at 25° C. The portion was left to stand for 30 minutes, and then subjected to neutralization titration with a 0.01 N sodium hydroxide aqueous solution using an automatic titrator (model: AUT-701, available from DKK-Toa Corp.). The amount of substance of the sodium hydroxide aqueous solution used for neutralization was found to be 0.378 mmol. The perfluorocarbon sulfonic acid resin which was obtained after the neutralization and which contained a sodium ion as the counter ion of the ion-exchange group was washed with pure water and dried in a vacuum, and the product was weighed.

The equivalent weight EW (g/eq) was calculated by the following formula:

$$EW=(w/M)-22$$

wherein M represents the amount of substance (mmol) of sodium hydroxide used for neutralization and w represents the mass (mg) of the perfluorocarbon sulfonic acid resin containing a sodium ion as the counter ion of the ion-exchange group. Based on this result, the equivalent weight EW=719 was obtained.

Example 1

First, 5 g of ethanol was put into a sample bottle at room temperature, then 0.45 g of tetramethoxysilane (available from Tokyo Chemical Industry Co., Ltd.) and 0.15 g of trimethoxy (3-glycidyloxypropyl) silane (available from Tokyo Chemical Industry Co., Ltd.) were put thereinto, and the contents were stir-mixed. Next, under stirring, 0.5 g of a sodium perfluorocarbonsulfonate aqueous solution (solid content: 25%, EW: 719) was put thereinto. Thereafter, 0.05 g of a 0.2 M hydrochloric acid aqueous solution was put thereinto and the contents were stirred for three hours, whereby a liquid composition was obtained.

Example 2

First, 5 g of ethanol was put into a sample bottle at room temperature, then 0.45 g of tetramethoxysilane (available from Tokyo Chemical Industry Co., Ltd.) and 0.15 g of trimethoxy (3-glycidyloxypropyl) silane (available from Tokyo Chemical Industry Co., Ltd.) were put thereinto, and the contents were stir-mixed. Next, under stirring, 1.2 g of a sodium perfluorocarbonsulfonate aqueous solution (solid content: 10%, EW: 920) was put thereinto. Thereafter, 0.05 g of a 0.2 M hydrochloric acid aqueous solution was put thereinto and the contents were stirred for three hours, whereby a liquid composition was obtained.

Example 3

First, 5 g of ethanol was put into a sample bottle at room temperature, then 0.4 g of tetramethoxysilane (available from Tokyo Chemical Industry Co., Ltd.) and 0.6 g of trimethoxy (3-glycidyloxypropyl) silane (available from Tokyo Chemical Industry Co., Ltd.) were put thereinto, and the contents were stir-mixed. Next, under stirring, 1.2 g of a potassium perfluorocarbonsulfonate aqueous solution (solid content: 10%, EW: 920) was put thereinto. Thereafter, 0.05 g of a 0.2 M hydrochloric acid aqueous solution was put thereinto and the contents were stirred for three hours, whereby a liquid composition was obtained.

Example 4

First, 5 g of ethanol was put into a sample bottle at room temperature, then 0.4 g of tetramethoxysilane (available from Tokyo Chemical Industry Co., Ltd.) and 0.47 g of triethoxymethylsilane (available from Tokyo Chemical Industry Co., Ltd.) were put thereinto, and the contents were stir-mixed. Next, under stirring, 0.5 g of a sodium perfluorocarbonsulfonate aqueous solution (solid content: 25%, EW: 719) was put thereinto. Thereafter, 0.05 g of a 0.2 M hydrochloric acid aqueous solution was put thereinto and the contents were stirred for three hours, whereby a liquid composition was obtained.

Example 5

First, 3 g of ethanol was put into a sample bottle at room temperature, then 0.065 g of tetramethoxysilane (available from Tokyo Chemical Industry Co., Ltd.) and 0.01 g of triethoxymethylsilane (available from Tokyo Chemical Industry Co., Ltd.) were put thereinto, and the contents were stir-mixed. Next, under stirring, 0.25 g of a sodium perfluorocarbonsulfonate aqueous solution (solid content: 25%, EW: 719) was put thereinto. Thereafter, 0.1 g of a 0.2 M hydrochloric acid aqueous solution was put thereinto and the contents were stirred for three hours, whereby a liquid composition was obtained.

Example 6

First, 5 g of ethanol was put into a sample bottle at room temperature, then 0.45 g of tetraethoxysilane (available from Tokyo Chemical Industry Co., Ltd.) and 0.15 g of trimethoxy (3-glycidyloxypropyl) silane (available from Tokyo Chemical Industry Co., Ltd.) were put thereinto, and the contents were stir-mixed. Next, under stirring, 0.5 g of a sodium perfluorocarbonsulfonate aqueous solution (solid content: 20%, EW: 617) was put thereinto. Thereafter, 0.1 g of a 0.2 M hydrochloric acid aqueous solution was put thereinto and the contents were stirred for three hours, whereby a liquid composition was obtained.

Comparative Example 1

First, 5 g of ethanol was put into a sample bottle at room temperature, then 0.2 g of tetraethoxysilane (available from Tokyo Chemical Industry Co., Ltd.) were put thereinto, and the contents were stir-mixed. Next, under stirring, 1.2 g of a sodium perfluorocarbonsulfonate aqueous solution (solid content: 25%, EW: 719) was put thereinto. Thereafter, 0.1 g of a 0.2 M hydrochloric acid aqueous solution was put thereinto and the contents were stirred for three hours, whereby a liquid composition was obtained.

Experimental Examples

The liquid compositions obtained in the examples and the comparative example were each applied to coat a microscope slide using a bar coater (bar No. 20). Each workpiece was placed in a hot-air dryer and dried using hot air at 120° C. for 20 minutes for surface treatment on the glass. Thereby, a film was formed on the glass substrate. Then, in accordance with the following methods, the antifouling properties and the abrasion resistance were evaluated as physical properties of the resulting substrate with an antifouling-treated surface.

Evaluation of Antifouling Properties

The evaluation was performed as follows using oleic acid and salad oil as pseudo-stains. The results are shown in Table 1.

(1) For the substrate with an antifouling-treated surface and an untreated microscope slide before the test, the haze was measured.

(2) A 20-μL portion of a pseudo-stain was applied to the substrate and the workpiece was left to stand at room temperature for 30 minutes. The substrate was then washed with flowing water shower and put into a hot-air dryer, followed by hot-air drying at 90° C. for 20 minutes.

(3) The dried microscope slide was left to cool down to room temperature. After the cooling, the haze was measured.

TABLE 1

| | Haze (%) | | |
|---|---|---|---|
| Example | Before test | Oleic acid | Salad oil |
| No surface treatment | 0.1 | 3.1 | 3 |
| Example 1 | 0.3 | 0.3 | 0.3 |
| Example 2 | 0.2 | 0.2 | 0.3 |
| Example 3 | 0.2 | 0.2 | 0.2 |
| Example 4 | 0.4 | 0.4 | 0.4 |
| Example 5 | 0.2 | 0.2 | 0.2 |
| Example 6 | 0.3 | 0.3 | 0.3 |
| Comparative Example 1 | 0.2 | 0.6 | 2.6 |

Abrasion Resistance Test

Each surface-treated glass substrate was placed horizontally and the surface thereof was brought into contact with cotton flannel fabric. A 250-g load was applied thereto and the fabric was moved back and forth at a rate of 20 mm/sec. The test was finished when the number of back-and-forth motions reached 500 times. The haze of the glass substrate after the test was measured. The results are shown in Table 2.

TABLE 2

| | Haze (%) | |
|---|---|---|
| Example | 0 motions | 500 motions |
| Example 1 | 0.3 | 0.3 |
| Example 2 | 0.2 | 0.2 |
| Example 3 | 0.2 | 0.2 |
| Example 4 | 0.4 | 0.4 |
| Example 5 | 0.2 | 0.2 |
| Example 6 | 0.3 | 0.3 |
| Comparative Example 1 | 0.2 | 25 |

TABLE 3

| | Contact angle (°) | |
|---|---|---|
| Example | In the air | In water |
| Example 1 | 78.5 | 43 |
| Example 2 | 83.1 | 27 |
| Example 3 | 80.8 | 44 |
| Example 4 | 76.3 | 58 |
| Example 5 | 69.3 | 27 |
| Example 6 | 74.8 | 38 |
| Comparative Example 1 | 115 | 22 |

The invention claimed is:

1. A composition comprising:
    a perfluorocarbon sulfonic acid resin or sulfonic acid salt resin thereof;
    a tetraalkoxysilane; and
    a trialkoxysilane,
    wherein the perfluorocarbon sulfonic acid resin comprises a copolymer containing a polymerized unit represented by —($CF_2$—CFZ)— (wherein Z is H, Cl, F, or a C1-C3 perfluoroalkyl group) and a polymerized unit represented by —($CF_2$—CF(—O—($CF_2$)$_m$—$SO_3$H))— (wherein m is an integer of 1 to 12), and
    the tetraalkoxysilane and the trialkoxysilane are present in a total amount of 100 parts by mass or more relative to 100 parts by mass of the perfluorocarbon sulfonic acid resin or sulfonic acid salt resin thereof.

2. The composition according to claim 1, wherein the perfluorocarbon sulfonic acid resin has an equivalent weight of 600 to 1000.

3. The composition according to claim 1, wherein the perfluorocarbon sulfonic acid resin or sulfonic acid salt resin thereof is a perfluorocarbon sulfonic acid salt resin.

4. The composition according to claim 1, further comprising an acid catalyst.

5. The composition according to claim 1, further comprising a solvent.

6. The composition according to claim 1, wherein the composition is a surface-treating agent.

7. A film obtained from the composition according to claim 1.

* * * * *